United States Patent
Roberge

(10) Patent No.: US 10,765,059 B2
(45) Date of Patent: Sep. 8, 2020

(54) HARVESTER WITH FEEDBACK ASSEMBLY AND METHODS OF USING THE SAME

(71) Applicant: CNH Industrial Canada, Ltd, Saskatoon (CA)

(72) Inventor: Martin J. Roberge, Saskatoon (CA)

(73) Assignee: CNH Industrial Canada, Ltd, Saskatoon (CA)

(*) Notice: Subject to any disclaimer, the term of this patent is extended or adjusted under 35 U.S.C. 154(b) by 84 days.

(21) Appl. No.: 15/898,698

(22) Filed: Feb. 19, 2018

(65) Prior Publication Data
US 2019/0254227 A1  Aug. 22, 2019

(51) Int. Cl.
| | |
|---|---|
| *A01D 34/00* | (2006.01) |
| *A01D 34/66* | (2006.01) |
| *A01D 78/14* | (2006.01) |
| *A01D 80/02* | (2006.01) |
| *A01D 41/14* | (2006.01) |
| *A01D 101/00* | (2006.01) |

(52) U.S. Cl.
CPC ......... *A01D 34/008* (2013.01); *A01D 34/006* (2013.01); *A01D 34/664* (2013.01); *A01D 41/141* (2013.01); *A01D 78/14* (2013.01); *A01D 80/02* (2013.01); *A01D 2101/00* (2013.01)

(58) Field of Classification Search
CPC .... A01B 63/22; A01B 69/008; A01D 34/008; A01D 34/736; A01D 34/74; A01D 34/664; A01D 78/14; A01D 80/20; A01D 80/02; A01D 34/006; A01D 41/141
USPC ........ 56/10.2 A, 10.2 F, 10.2 R, 16.7; 172/4, 172/265, 430, 712
See application file for complete search history.

(56) References Cited

U.S. PATENT DOCUMENTS

| | | | | |
|---|---|---|---|---|
| 3,402,784 A | * | 9/1968 | Storm .................. | A01B 69/008 180/401 |
| 3,425,197 A | * | 2/1969 | Kita ..................... | A01D 34/008 56/10.2 F |
| 3,498,037 A | | 3/1970 | Hobson et al. | |
| 3,906,710 A | | 9/1975 | Pask | |
| 4,147,016 A | * | 4/1979 | Jensen .................. | A01D 46/08 56/10.4 |

(Continued)

FOREIGN PATENT DOCUMENTS

| | | |
|---|---|---|
| DE | 102011009842 A1 | 8/2012 |
| GB | 2295304 A | 12/1993 |

(Continued)

OTHER PUBLICATIONS

European Search Report for Patent Application No. 19157907.7-1006 dated Jul. 26, 2019 (8 pages).

*Primary Examiner* — Robert E Pezzuto
(74) *Attorney, Agent, or Firm* — Patrick Sheldrake; Peter Zacharias

(57) ABSTRACT

A feedback assembly for a harvester includes a chassis, at least one rod coupled to the chassis, and at least one tine rotatably coupled to the at least one rod. The at least one tine defines an elongated body including a linear section extending from the at least one rod, and an angled section extending at an angle from the linear section. The at least one tine configured to hang substantially perpendicularly relative to a direction of travel of the harvester when in a non-actuated position and configured to rotate away from the direction of travel of the harvester when in an actuated position.

19 Claims, 11 Drawing Sheets

(56) References Cited

U.S. PATENT DOCUMENTS

| | | | | |
|---|---|---|---|---|
| 4,723,608 | A * | 2/1988 | Pearson | A01B 63/22 |
| | | | | 172/265 |
| 4,777,785 | A * | 10/1988 | Rafaels | A01D 34/008 |
| | | | | 56/10.2 A |
| 5,507,137 | A * | 4/1996 | Norris | A01D 34/008 |
| | | | | 56/10.2 J |
| 5,528,888 | A * | 6/1996 | Miyamoto | A01B 69/008 |
| | | | | 56/10.2 F |
| 5,579,716 | A * | 12/1996 | Groff | A01B 69/001 |
| | | | | 116/28 R |
| 7,412,905 | B1 | 8/2008 | Bishel | |
| 7,647,753 | B2 * | 1/2010 | Schlipf | A01D 41/141 |
| | | | | 56/10.2 E |
| 2004/0187457 | A1 | 9/2004 | Colens | |
| 2016/0295799 | A1 | 10/2016 | Grau Calafell et al. | |

FOREIGN PATENT DOCUMENTS

| | | |
|---|---|---|
| GB | 2290212 B | 4/1997 |
| GB | 2334874 B | 11/1999 |
| WO | WO201132307 A1 | 3/2011 |

* cited by examiner

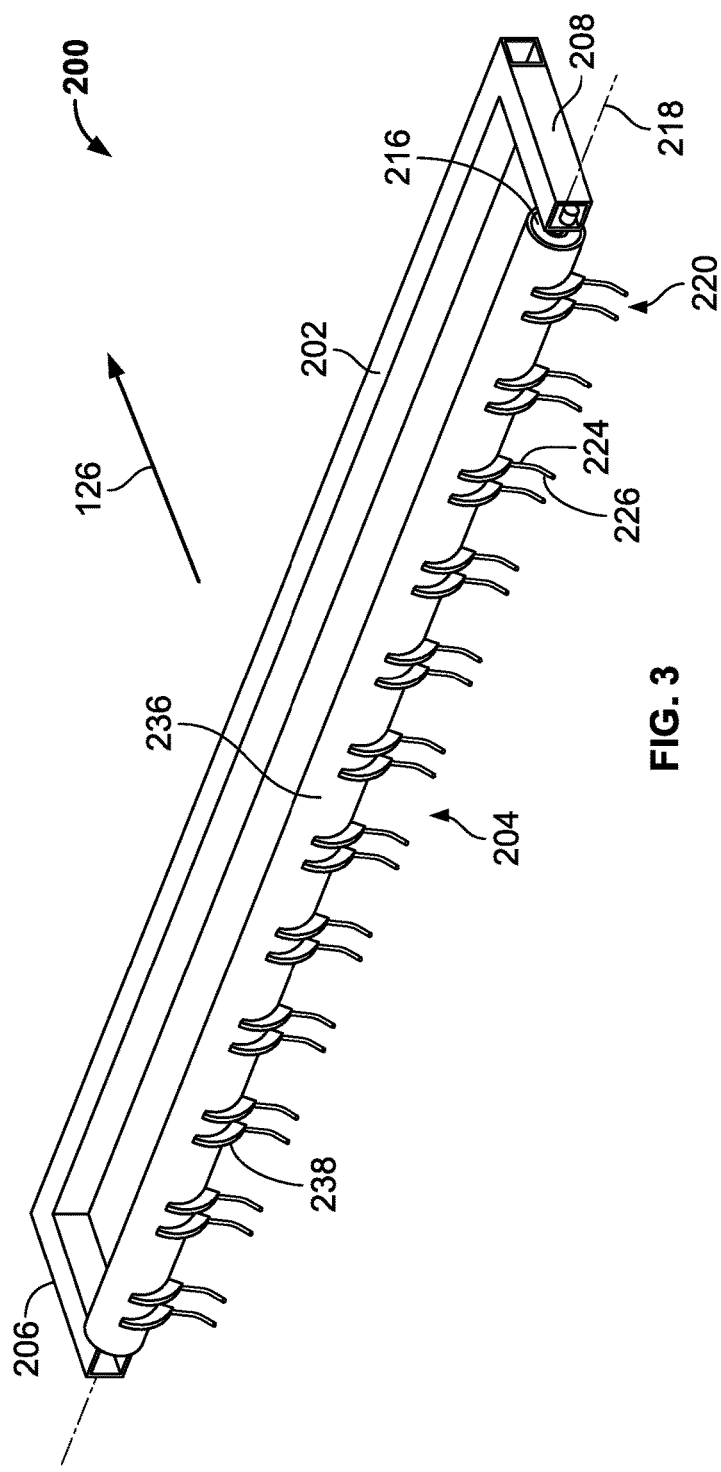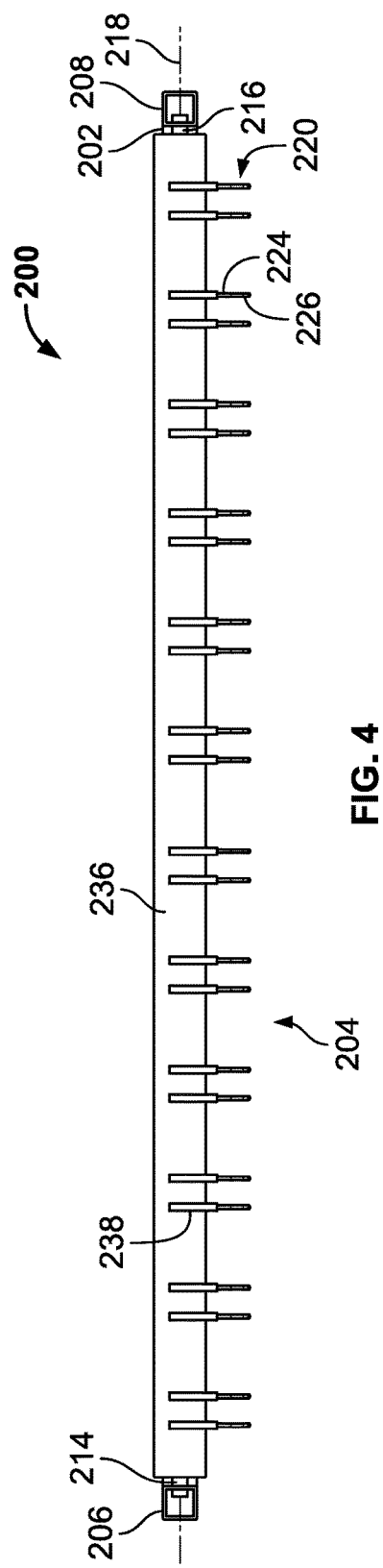

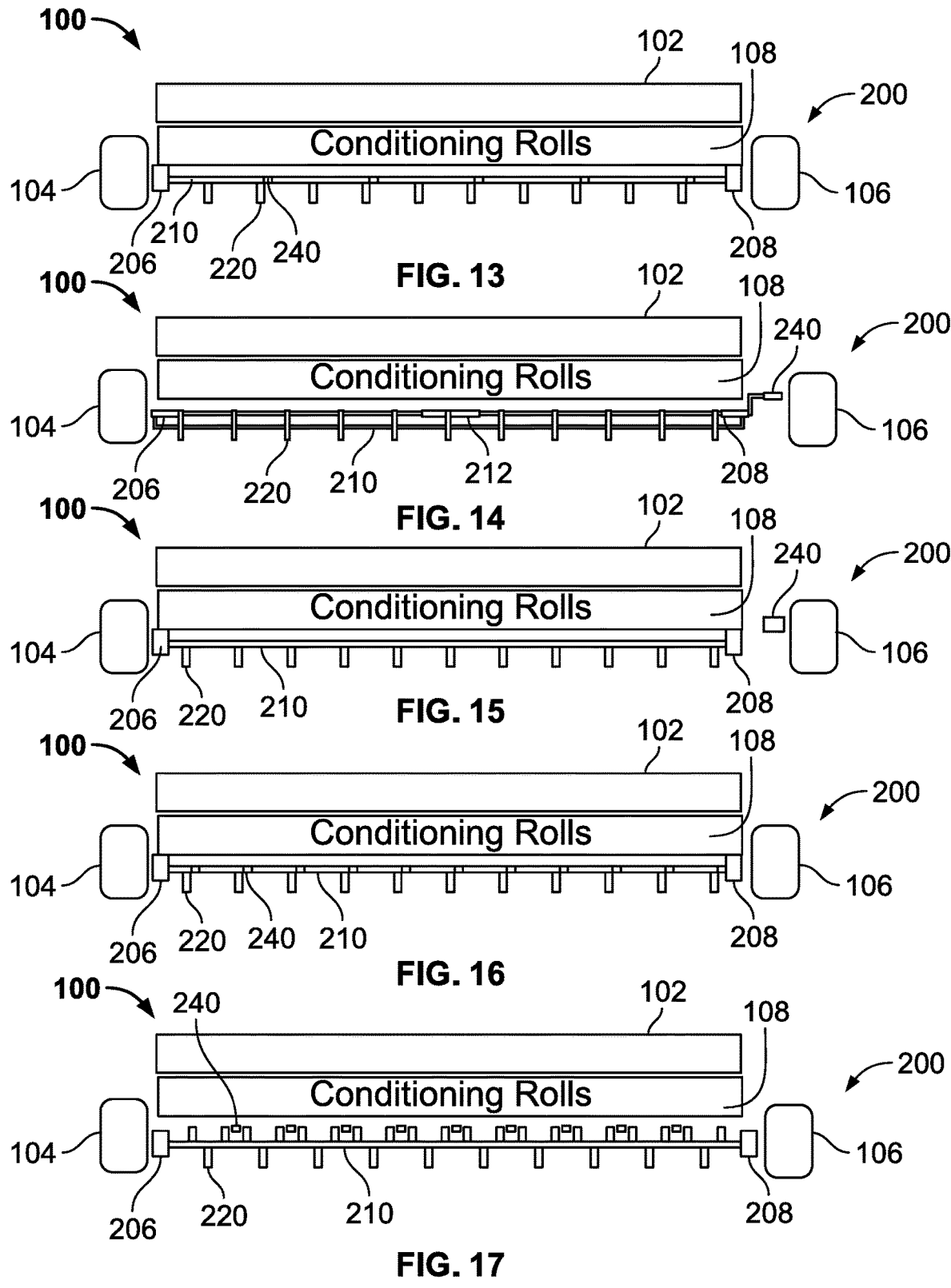

US 10,765,059 B2

HARVESTER WITH FEEDBACK ASSEMBLY AND METHODS OF USING THE SAME

BACKGROUND

Harvesters such as windrowers, tractors, forage harvesters, and mowers (e.g., self-propelled and pull-behind) generally include a header operable to cut crops. Typical construction for such harvesters includes a housing with a cutterbar having multiple rotatable blades for cutting crop. Detection of streaks in crop cutting can be visually detected from a cab of the harvester after the harvester has passed a great distance due to the line of sight from the cab. Adjustment of the cutterbar can therefore only be performed after the harvester has passed over a portion of the field, resulting in uneven crop cutting.

For optimum crop cutting operation, traditional harvesters can monitor the loads exerted on the cutterbar or on the individual blade modules with optical sensors. Reference is made, for example, to U.S. Pat. Nos. 8,490,371; 9,241,440; and 8,931,245, that illustrate such harvesters, the disclosures of which are incorporated herein by reference in their entireties. However, such sensors can malfunction or can be contaminated with dust during operation, resulting in inaccurate signal transmission to the controller.

SUMMARY

The disclosure relates to a header including a feedback assembly (e.g., a cutting quality feedback assembly) for detecting the quality of operation of one or more blade assemblies of a cutterbar during operation of the harvester. Particularly, the feedback assembly comprises tines configured to rotate relative to the chassis when in contact with uneven crop. Rotation of each individual tine can be detected with a sensor, and such detection can be electronically transmitted to a controller. The controller can be actuated to adjust operation of the one or more blade assemblies to improve or optimize the cutting quality performed by the one or more blade assemblies.

In accordance with some embodiments of the present disclosure, an exemplary feedback assembly for a harvester is provided. The feedback assembly comprises a chassis, one or more rods coupled to the chassis, and one or more tines rotatably coupled to the one or more rods. Each of the one or more tines defines an elongated body including a linear section extending from the one or more rods, and an angled section extending at an angle from the linear section.

The one or more rods can be fixedly coupled to the chassis. Each of the one or more tines can be configured to hang substantially perpendicularly relative to a direction of travel of the harvester (due to gravity) when in a non-actuated position (e.g., when crop does not contact or interfere with the tines). Each of the one or more tines can be independently rotatable relative to the one or more rods. The one or more tines are configured to rotate away from a direction of travel of the harvester when in an actuated position (e.g., when crop is in contact or interferes with the tines).

The angled section can extend from the linear section in a direction away from a direction of travel of the harvester. The elongated body of each tine comprises an elongated rod defining a uniform diameter. The linear section can define approximately 75% of an overall length of each tine, and the angled section can define approximately 25% of the overall length of each tine. The angle between the angled section and the linear section can be from approximately 15 degrees to approximately 45 degrees. An overall weight of each tine can be from approximately 15 grams to approximately 25 grams. The weight and/or shape of each tine allows for the tine to react appropriately to the presence of streaks in the crop, ensuring that the tine will not over or underreact.

The feedback assembly comprises one or more sensors coupled to at least one of the chassis and the one or more rods. The one or more sensors can be configured to detect a rotational position of the one or more tines relative to the one or more rods. In one embodiment, the one or more sensors can be at least one of an optical sensor, a photo-electric sensor, a rotary potentiometer, combinations thereof, or the like.

In some embodiments, the feedback assembly comprises a seal disposed over each of the one or more sensors. In some embodiments, the feedback assembly comprises a housing disposed over the one or more rods. The one or more tines can be rotatably disposed relative to the housing. In some embodiments, the one or more rods can comprise a left-hand rod and a right-hand rod connected at a central support.

In accordance with embodiments of the present disclosure, an exemplary harvester is provided. The harvester comprises a frame, first and second wheels rotatably coupled to the frame, and a feedback assembly. The feedback assembly comprises a chassis, one or more rods coupled to the chassis, and one or more tines rotatably coupled to the one or more rods. Each of the one or more tines defines an elongated body including a linear section extending from the one or more rods, and an angled section extending at an angle from the linear section.

The harvester comprises one or more crop conditioning rolls rotatably coupled to the frame. In some embodiments, the harvester can include a flail conditioning system in addition to or instead of the crop conditioning rolls. The harvester comprises a lifting assembly operably coupling the feedback assembly to the frame. The harvester comprises one or more blade assemblies rotatably coupled to the frame.

In accordance with embodiments of the present disclosure, an exemplary feedback assembly for a harvester is provided. The feedback assembly comprises a chassis, one or more rods coupled to the chassis, and one or more tines rotatably coupled to the one or more rods. Each of the one or more tines can define an elongated body including a linear section extending from the one or more rods, and an angled section extending at an angle from the linear section. Each of the one or more tines can be configured to hang substantially perpendicularly relative to a direction of travel of the harvester when in a non-actuated position. The one or more tines can be configured to rotate away from the direction of travel of the harvester when in an actuated position.

In accordance with embodiments of the present disclosure, an exemplary method of operating a harvester is provided. The method comprises providing a harvester including a frame, first and second wheels rotatably coupled to the frame, a controller, a cutterbar including one or more blade assemblies, and a feedback assembly. The feedback assembly comprises a chassis, one or more rods coupled to the chassis, one or more tines rotatably coupled to the one or more rods, and one or more sensors. Each of the one or more tines can define an elongated body including a linear section extending from the one or more rods, and an angled section extending at an angle from the linear section.

The method comprises passing the harvester over crop such that the one or more tines hang substantially perpendicularly relative to a direction of travel of the harvester. The method comprises actuating at least one or more tines to rotate away from the direction of travel of the harvester upon contact with uneven crop. In some embodiments, the method comprises detecting a change in a rotational position of the rotated tine with the one or more sensors. In some embodiments, the method comprises transmitting the rotational position of the rotated tine to the controller. In some embodiments, the method comprises adjusting operation of the one or more blade assemblies based on the detected rotation of the tine.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed harvester, reference is made to the accompanying figures, wherein:

FIG. 3 is a front perspective view of a feedback assembly of an exemplary harvester of the present disclosure;

FIG. 4 is a front view of a feedback assembly of an exemplary harvester of the present disclosure;

FIG. 13 is a diagrammatic front view of a feedback assembly of an exemplary harvester of the present disclosure;

FIG. 14 is a diagrammatic front view of a feedback assembly of an exemplary harvester of the present disclosure;

FIG. 15 is a diagrammatic front view of a feedback assembly of an exemplary harvester of the present disclosure;

FIG. 16 is a diagrammatic front view of a feedback assembly of an exemplary harvester of the present disclosure;

FIG. 17 is a diagrammatic front view of a feedback assembly of an exemplary harvester of the present disclosure;

DETAILED DESCRIPTION

Figure 1:
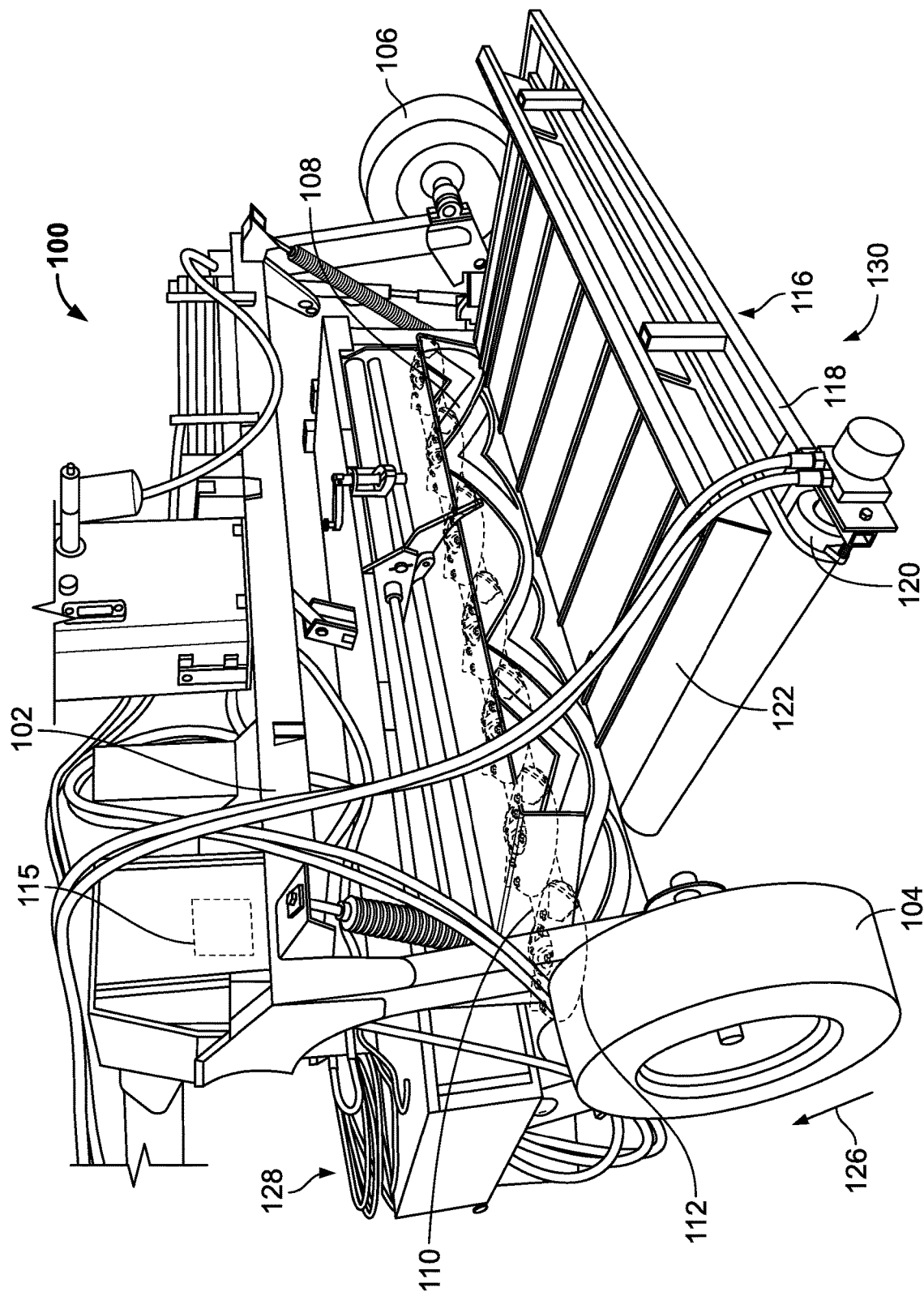
FIG. 1 is a rear perspective view of an exemplary harvester of the present disclosure.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g., 3, 4, or 5.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±1%, ±0.5%, ±0.4%, ±0.3%, ±0.2%, ±0.1%, ±0.09%, ±0.08%, ±0.07%, ±0.06%, ±0.05%, ±0.04%, ±0.03%, ±0.02% or ±0.01% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, lawn mower, seeding equipment, equipment for measuring soil and/or crop residue roughness after passage of ground engaging tools, or a combine including a baling mechanism. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

The term "drive system" as used herein is defined as an assembly, hydraulic or mechanical arrangement that allows for control of the front and/or rear wheels of the harvester.

The term "information" as used herein is defined as data values attributed to parameters. In some embodiments, information is digital and/or analog information. In some embodiments, information is the current operable mode of the harvester. In some embodiments, information is the quality of crop mowing of the harvester. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which comprises but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may comprise any apparatus that can contain, store, communicate, propagate, or transport the program for use by or in connection with the instruction execution system, or harvester. In some embodiments, the harvester comprises a software system with executable code that executes different hydraulic states based on operator settings (e.g., regulating the position of the feedback assembly). In some embodiments, the disclosure also relates to a computer software product with executable code that automatically toggles between or through different hydraulic states based on operator settings of the harvester. The software program product may be on any medium or a component of a system optionally configured for update or install into the software of an existing harvester.

In some embodiments, the medium may be or may comprise an electronic, magnetic, optical, electromagnetic, InfraRed (IR), or semiconductor system (or apparatus or device) or a propagation medium. Some demonstrative examples of a computer-readable medium may comprise a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks comprise Compact Disk-Read-Only Memory (CD-ROM), Compact Disk-Read/Write (CD-R/W), DVD, or the like.

In some embodiments, the disclosure relates to a processing system including a processing device suitable for storing and/or executing program code and may comprise at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. In some embodiments, the memory is capable of storing preferred settings or information about setting the position of the feedback assembly.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used. Any sensor disclosed herein may function on any disclosed harvester by integration into one or more data processing systems of the harvester. For example, in some embodiments, the disclosure relates to a data processing system including executable software program product configured for sending and receiving information about the settings of the feedback assembly.

The term "real-time" and the phrase "in real-time" as used herein are defined as a way of describing a process, event, or action that occurs simultaneously with the process of actively operating a harvester. In some embodiments, various sensors continuously sense information about the harvester (e.g., the quality of the crop as detected by the feedback assembly) and transmit that information to a controller in real-time. In some embodiments, an operator may adjust values or thresholds for one or more hydraulic states in real-time through the operator interface by accessing the system electronically and inputting one or a plurality of values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the instant invention can be used with substantially any of such machines. Reference is made, for example, to U.S. Pat. Nos. 9,101,090; and 8,020,648; that illustrate such windrowers, the disclosures of which are incorporated herein by reference in their entireties. The instant invention can also be used with any type of agricultural mower, such as self-propelled or pull-behind mowers. Reference is made, for example, to U.S. Pat. Nos. 9,565,800; 9,596,808; 8,490,371; 9,241,440; and 8,931,245, that illustrate such mowers and controllers, the disclosures of which are incorporated herein by reference in their entireties. Embodiments of the present invention are particularly well suited, but in no way limited to, use with windrowers or mowers. The present invention may also find utility in agricultural harvesters including, for example, a self-propelled windrower, a forage harvester, a disc mower, and a lawn mower.

In some embodiments, the method is performed by a harvester comprising a crop supply chamber, a crop gating system, and one or more sensors. In some embodiments, the one or more sensors are capable of determining a range of information. In some embodiments, the one or more sensors are in electronic communication with one or more controllers. In some embodiments, the one or more sensors can be a tine position sensor, a rotary potentiometer, an optical sensor, or the like. In some embodiments, additional sensors can be used to assist in field function of the windrower by sensing, e.g., loads on the cutterbar, speed of discs/conditioner rolls on disc heads, speed of reels, sickles, and draper belts on draper units, and merger belt speed and/or merger position (if a crop merger is in use), lift arm height, header tilt, ground clearance, combinations thereof, or the like.

Figure 2:
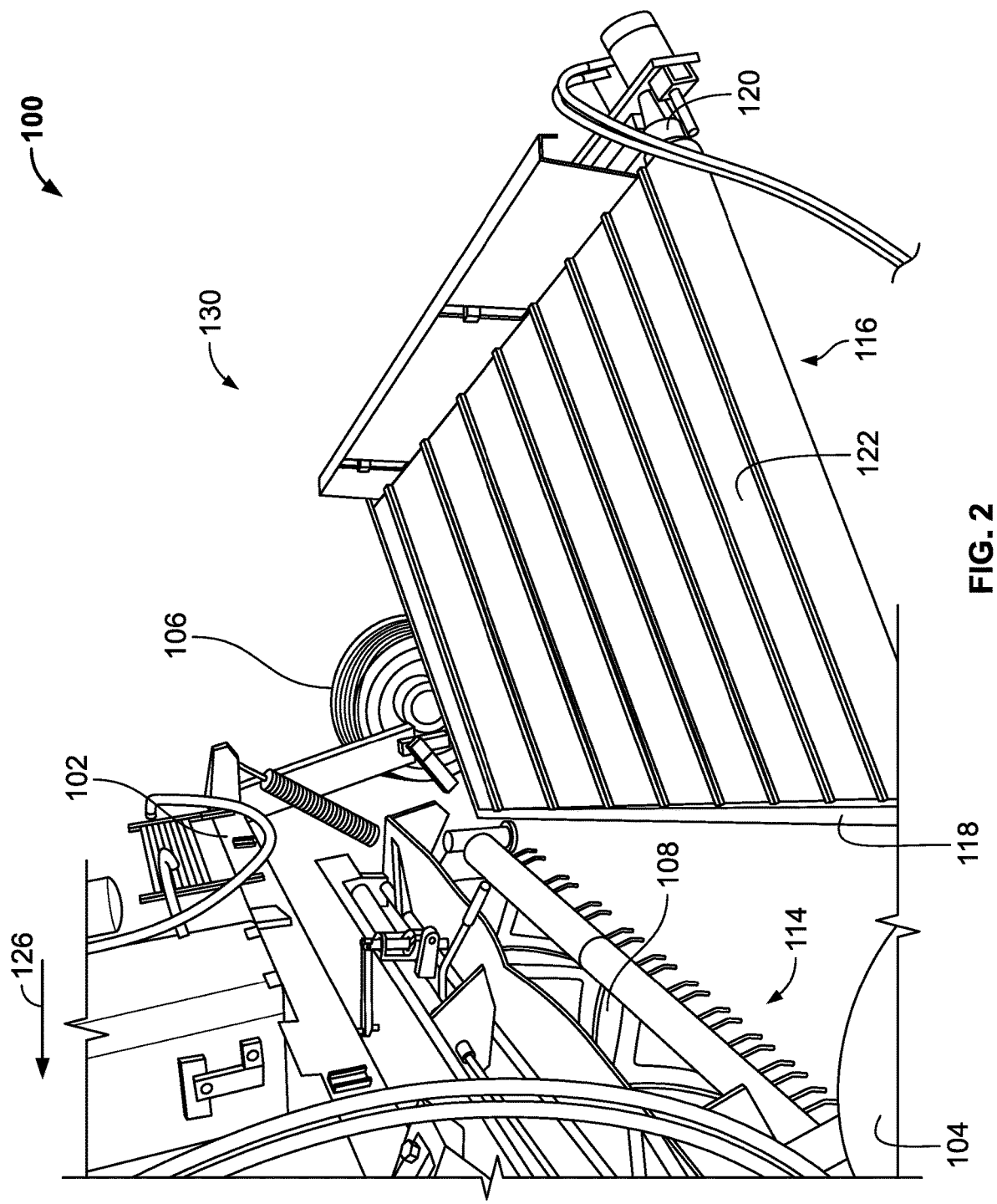
FIG. 2 is a side view of an exemplary harvester of the present disclosure.

FIGS. 1 and 2 show rear perspective and side views of an exemplary harvester 100. The harvester 100 comprises a frame 102 and first and second wheels 104, 106 rotatably coupled to the frame. The harvester 100 comprises one or more conditioning rolls 108 rotatably coupled to the frame 102, and a cutterbar 110 with blade assemblies 112 for cutting crop as the harvester 100 moves across a field. In some embodiments, the harvester 100 can comprise a belt assembly 116 including a support frame 118, rollers 120, and a conveyor belt 122. The belt assembly 116 is coupled to the frame 102 of the harvester 100.

The harvester 100 also comprises an exemplary feedback assembly 114 (e.g., cutting quality feedback assembly) coupled to the frame 102. As will be discussed in greater detail below, the feedback assembly 114 provides feedback to a controller 115 located in the harvester 100 regarding the quality of the cut crop and, based on such feedback, the controller 115 can regulate the cutterbar 110 to improve the quality of the cut crop (i.e. the height, movement and/or position). Although shown as mounted to the frame 102, it should be understood that the controller 115 can be anywhere on the harvester 100 and is communicatively coupled (wired and/or wirelessly) to the feedback assembly 114. In one embodiment, the feedback assembly 114 can indicate whether crop is being cut unevenly by the blade assemblies 112. During normal operation, the harvester 100 is configured to be driven or pulled in a direction 126, with a proximal end 128 of the harvester 100 defining the leading edge and a distal end 130 of the harvester 100 defining the trailing edge.

Figure 6:
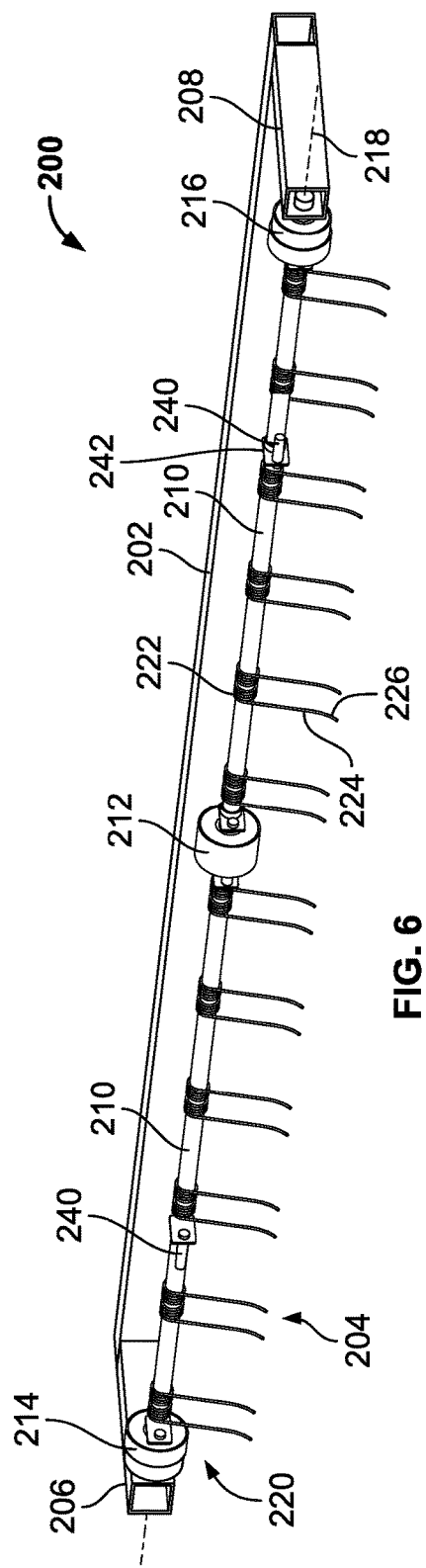
FIG. 6 is a front perspective view of a feedback assembly of an exemplary harvester of the present disclosure, with a housing removed on both sides of the assembly.
Figure 7:
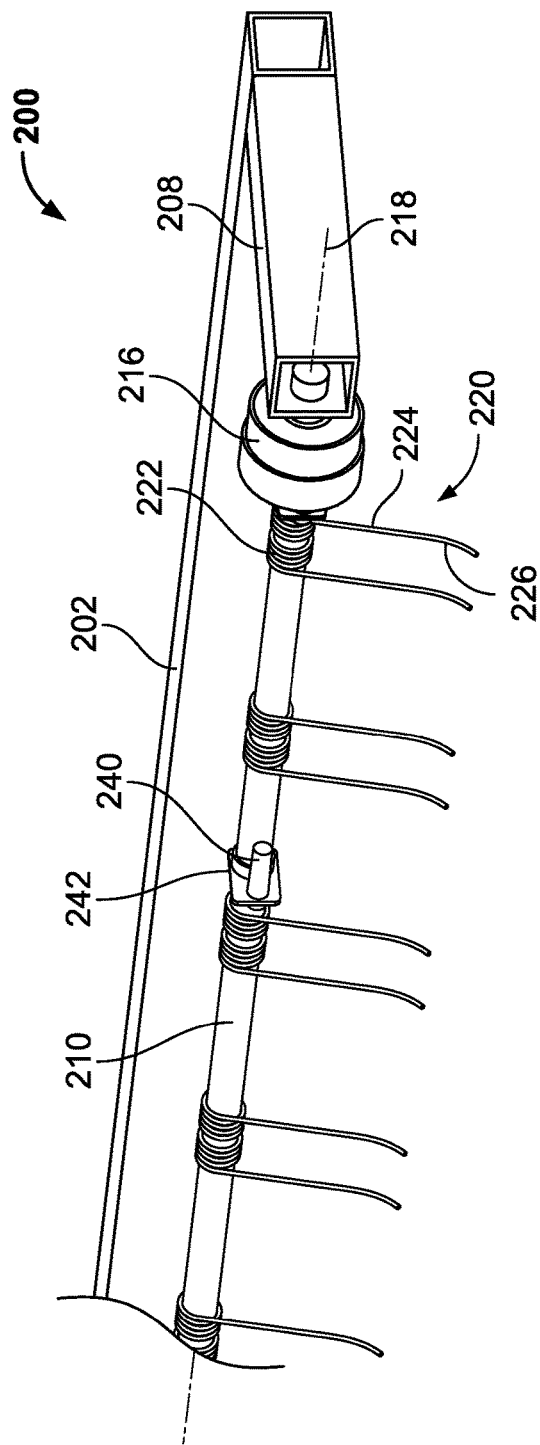
FIG. 7 is a detailed, front perspective view of a feedback assembly of an exemplary harvester of the present disclosure.
Figure 9:
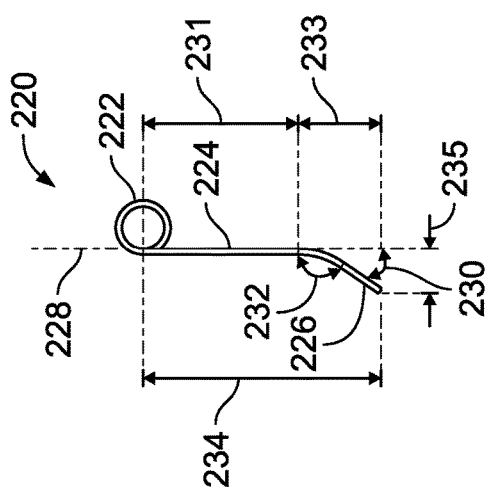
FIG. 9 is a side view of a tine of an exemplary harvester of the present disclosure.
Figure 8:
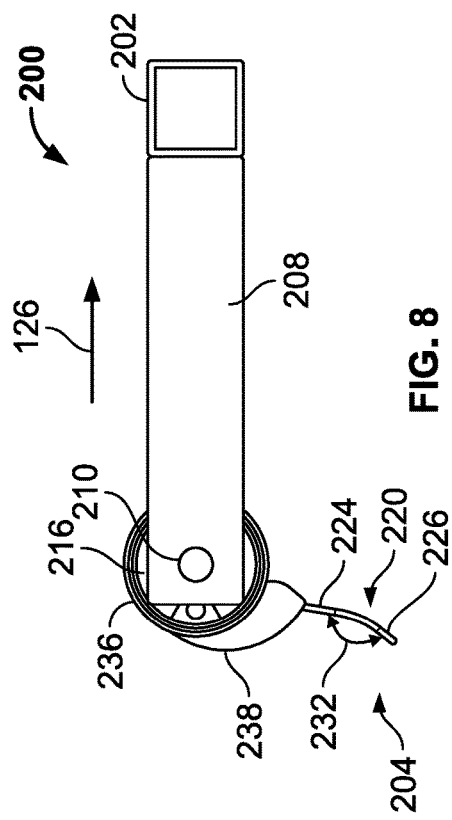
FIG. 8 is a side view of a feedback assembly of an exemplary harvester of the present disclosure.

FIGS. 3-7 show views of an exemplary feedback assembly 200 (hereinafter "feedback assembly 200"), and FIGS. 8 and 9 show detailed, side views of components of the feedback assembly 200. The feedback assembly 200 can be incorporated into the harvester 100 such that the feedback assembly 200 is disposed underneath and/or behind the conditioning rolls 108 of the conditioning system. Particularly, the feedback assembly 200 comprises a chassis 202 that can be coupled to the frame 102 of the harvester 100. The feedback assembly 200 is disposed directly above the field and provides feedback regarding the quality of the cut crop to the controller of the harvester 100.

In some embodiments, the chassis 202 defines a substantially U-shaped configuration. The feedback assembly 200 comprises a feedback section 204 fixedly coupled to the chassis 202. For example, the feedback section 204 can be fixedly coupled between side members 206, 208 of the chassis 202. The feedback section 204 comprises one or more rods 210 fixedly coupled to the chassis 202. In some embodiments, the feedback section 204 comprises a single rod 210 (e.g., a shaft) extending between the side members 206, 208 of the chassis 202. In some embodiments, the feedback section 204 comprises two or more rods 210 extending in-line between the side members 206, 208 of the chassis 202 (e.g., FIGS. 5 and 6).

In some embodiments, the feedback section 204 comprises two rods 210 (e.g., left-handed and right-handed rods 210). In such embodiment, the feedback section 204 comprises a central support 212 disposed between the rods 210. In one embodiment, the feedback section 204 can comprise side supports 214, 216 disposed between the rods 210 and the side members 206, 208. In such embodiment, the rods 210, central support 212, and side supports 214, 216 can be aligned along a central lateral axis 218. The axis 218 can be substantially perpendicular to the direction 126 of travel of the harvester 100. In some embodiments, the central support 212 allows each of the rods 210 to be independently detached from the feedback section 204 for maintenance. In one embodiment, each of the supports 212-216 can comprise bearings to assist in removal of the rods 210.

Figure 5:
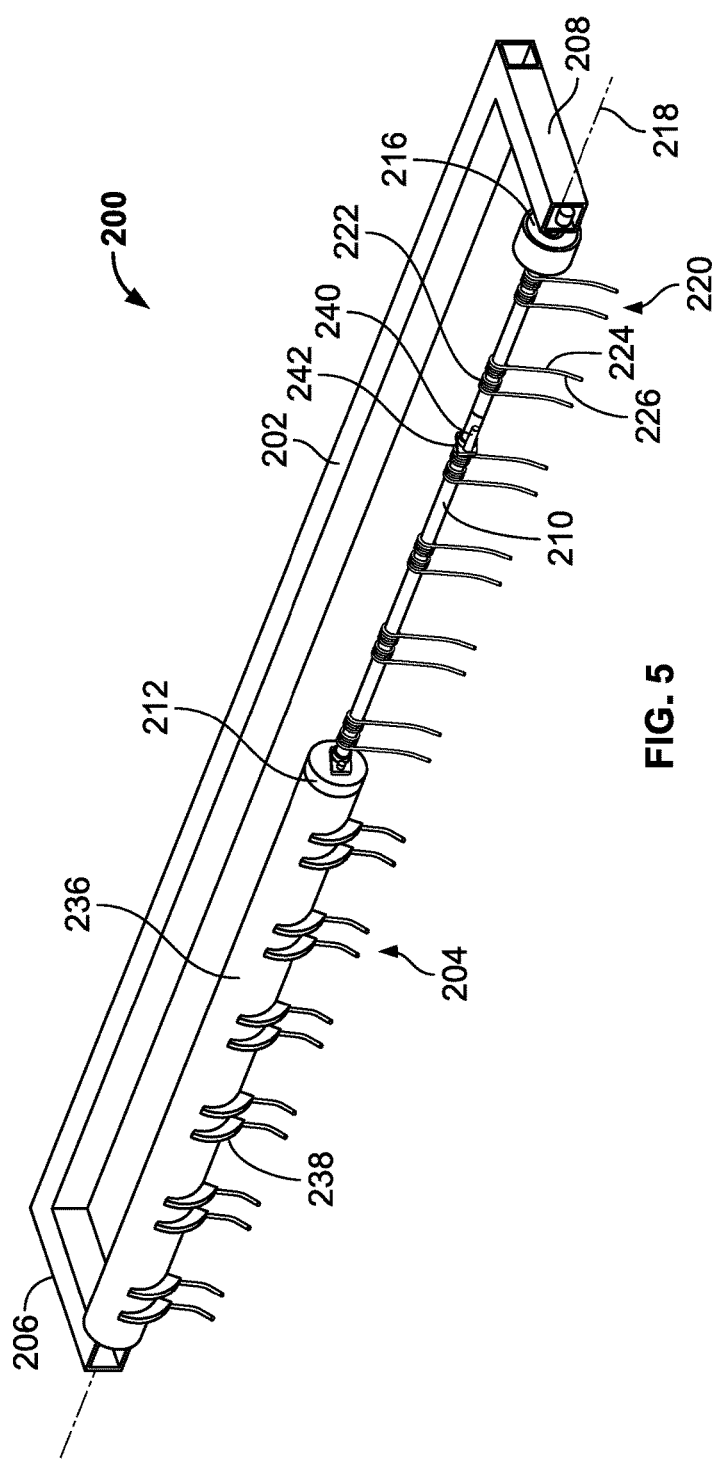
FIG. 5 is a front perspective view of a feedback assembly of an exemplary harvester of the present disclosure, including a housing on one side of the assembly.

The feedback section 204 comprises one or more tines 220 rotatably coupled to the rods 210. The tines 220 form a curtain for detection of uneven or undesired cutting quality of the crop (e.g., grass streaks). In some embodiments, detection of such grass streaks can indicate a broken blade assembly 112, necessitating maintenance from the operator. In embodiments having a single rod 210, the tines 220 can form a single curtain. In embodiments having two or more rods 210, separate curtains can be formed. In some embodiments, the tines 220 can be rotatably mounted in pairs to the rods 210. The tines 220 are spaced from each other along the rods 210 to provide mechanically actuated sensing devices for detecting the quality of the cut crop. Each tine 220 comprises a mounting section 222 directly coupled to the rod 210, and an elongated body including a linear section 224 and a backwardly angled section 226. The mounting section 222 can be in the form of an elongated member coiled to form a cylindrical tube through which the rod 210 can be passed (e.g., a spring). The tine 220 therefore rotates about the rod 210 at the mounting section 222. In some embodiments, two tines 220 can be connected together by the mounting sections 222, thereby defining a tine pair as shown in FIGS. 5-7.

As shown in the detailed views of FIGS. 8 and 9, the elongated body of each tine 220 can define a thin, wire-like member (e.g., an elongated rod). In some embodiments, the elongated body of each tine 220 can define a diameter, e.g., from about 3 mm to about 5 mm, about 4 mm or approximately 5 mm, about 4.5 mm, about 4.75 mm, or the like. In some embodiments, the elongated body of each tine 220 can define a substantially uniform diameter along the linear and angled sections 224, 226. The overall small cross-section of the elongated body of each tine 220 provide sufficient surface area to be actuated by uneven crop, while preventing excessive force from being applied to the crop. The small cross-section also prevents the tines 220 from damaging crop during harvester 100 operation, ensuring that the tines 220 "float" over the crop. The narrow, thin and uniform configuration of the metal or steel tines 220 provides for improved operation of the harvester 100. Particularly, the configuration of the tines 220 allows for the desired moment of inertia during rotation of the tines 220 about the shaft 210, and the metal or steel material of fabrication ensures longevity in operation. Tines of different configurations, such as the paddle-shaped tines disclosed in UK Patent Application No. GB 2290212A, would need to be extremely thin and made of plastic to approach the moment of inertia of the exemplary tines 220, resulting in faster wear. As shown in FIGS. 3-7, implementation of multiple, laterally offset tines 220 allows the feedback assembly 200 to detect a greater amount of detail regarding crop streaks (e.g., which blade assemblies 112 are malfunctioning and creating crop streaks).

The linear section 224 extends from the mounting section 222 in a straight (e.g., unbent) manner. In one embodiment, the linear section 224 can extend tangentially from the mounting section 222. In the non-actuated configuration shown in FIGS. 8 and 9, the linear section 224 can extend substantially parallel to a vertical axis 228. The axis 228 can be substantially perpendicular to horizontal. The angled section 226 can extend at an angle 232 from the linear section 224 (see, e.g., FIG. 9), and at an angle 230 from the vertical axis 228. Although the angled section 226 also defines a substantially straight (e.g., unbent) section, the angled section 226 itself is radially offset from the linear section 224 (and the vertical axis 228) by the angles 230, 232.

In some embodiments, the angle 232 can be, e.g., from approximately 130 degrees to approximately 165 degrees, from approximately 140 degrees to approximately 155 degrees, from approximately 145 degrees to approximately 150 degrees, approximately 150 degrees, approximately 151 degrees, approximately 152 degrees, or the like.

In some embodiments, the length 231 of the linear section 224 can be, e.g., from approximately 100 mm to approximately 140 mm, from approximately 110 mm to approximately 130 mm, approximately 120 mm, or the like. In some embodiments, the overall length 233 of the angled section 226 can be, e.g., from approximately 35 mm to approximately 65 mm, approximately 40 mm to approximately 60 mm, approximately 45 mm to approximately 55 mm, approximately 45 mm, or the like. In some embodiments, the linear section 224 can define approximately 75% of an overall length 234 of each tine 220, and the angled section 226 can define approximately 25% of the overall length 234 of each tine 220. The overall length 234 refers to the linear section 224 and the angled section 226 (not the mounting section 222). In some embodiments, the offset distance 235 between the linear section 224 and the angled section 226 can be, e.g., from about 10 mm to about 20 mm, from about 12 mm to about 18 mm, from about 14 mm to about 16 mm, about 14 mm, about 14.5 mm, about 15 mm, or the like.

In some embodiments, the weight of a single tine 220 (e.g., the linear and angled sections 224, 226 without the mounting section 222) can be, e.g., from approximately 20 grams to approximately 30 grams, from approximately 21 grams to approximately 29 grams, from approximately 22 grams to approximately 28 grams, from approximately 23 grams to approximately 27 grams, from approximately 24 grams to approximately 26 grams, approximately 25 grams, approximately 23 grams, or the like. In one embodiment, the weight of two tines 220 coupled together with their respective mounting sections 222 can be, e.g., from approximately 190 grams to approximately 230 grams, from approximately 200 grams to approximately 220 grams, approximately 210 grams, approximately 212 grams, or the like. In one embodiment, the tines 220 can be fabricated from, e.g., plastic, aluminum, metal, or the like, while ensuring the light weight is maintained.

The low weight of each tine 220 allows for accurate actuation by grass streaks due to the low amount of force needed to rotate the tine 220. In some embodiments, a damper or rotary spring can be used to provide for smoother rotation and return of the tine 220. Such damper or rotary spring can also prevent false actuation of the tine 220 by ensuring a preset force is imparted on the tine 220 for rotation to occur. False rotation from the wind can therefore be prevented. The tines 220 are thereby maintained substantially stationary (e.g., non-actuated) until a sufficient force is imparted on the tine 220 by the crop streak.

The angled section 226 extends from the linear section 224 away from the direction 126 of travel of the harvester 100. Thus, upon coming into contact with uneven crop, the angled section 226 catches on the crop and rotates the tine 220 in a direction opposite or away from the direction 126 of travel (e.g., actuation of the tine 220). The bent lower end of the tine 220 formed by the angled section 226 reduces force imparted on crop with the tine 220. As noted above and shown in FIG. 9, in the non-actuated position or configuration, gravity allows the tine 220 to hang substantially perpendicularly relative to the direction 126 of travel and horizontal.

When a tine 220 comes into contact with crop, the force imparted on the tine 220 by the crop forces the tine 220 to rotate about the rod 210, resulting in actuation of the tine 220. It should be understood that each tine 220 is capable of independently rotating relative to the rod 210, providing for actuation of a tine 220 only in an area where uneven crop is found. In one embodiment, the tine 220 is capable of freely rotating or swinging about the rod 210. In one embodiment, the mounting section 222 can create a friction fit around the rod 210 (or can comprise an element that provides resistance between the mounting section 222 and the rod 210), such that a predetermined amount of force from the crop is needed to rotate the tine 220. In some embodiments, rotary springs can be used to maintain each of the tines 220 in place. In such embodiments, a predetermined force from the crop streaks is capable of rotating the tine 220.

The feedback section 204 comprises a housing 236 (e.g., shielding) disposed over the rods 210, the central support 212, and the side supports 214, 216. The housing 236 can define a substantially tubular or cylindrical component configured to surround and protect the rods 210, the central support 212, and the side supports 214, 216. The housing 236 can be removed for maintenance or replacement of the tines 220. The housing 236 comprises multiple slots formed therein through which the linear section 224 of each respective tine 220 passes. The length of the slot in the housing 236 can be dimensioned to correspond with the radial angle through which the tine 220 can rotate. The ends of the slot can also act as structural stops to set rotational limits for the tine 220. The feedback section 204 comprises a seal 238 disposed over each tine 220, with the linear section 224 extending from the bottom of the seal 238. In one embodiment, the seal 238 can be formed from a flexible, rubber material configured to prevent or reduce infiltration of dust and crop through the slot in the housing 236. In one embodiment, the seal 238 can cover the sensors 240 to prevent dust and crop infiltration, resulting in more accurate detection from the sensors 240.

The feedback section 204 comprises one or more sensors 240 coupled to the chassis 202 and/or the rods 210. In one embodiment, the sensors 240 can be, e.g., optical sensors, photoelectric sensors, rotary potentiometers, presence sensors, Hall effect sensors, light detection, ranging (LIDAR) sensors, piezoelectric sensors in a semi-flexible tine capable of producing a small voltage when the time is being deflected by a crop or grass streak, combinations thereof, or the like. The sensors 240 can be disposed within the feedback section 204 such that each sensor 240 is capable of detecting a rotational position of one or more tines 220 relative to the rod 210 (or another starting position). For example, the non-actuated position of the tine 220 hanging substantially perpendicularly to horizontal can be set as a "zero" position, and any radial change is detected by the sensor 240. In one embodiment, the sensors 240 can be mounted to flanges 242 coupled to the rods 210. When the tine 220 rotates, the tine 220 passes through a field associated with the sensor 240, allowing the sensor 240 to detect the tine 220 rotation.

Figure 10:
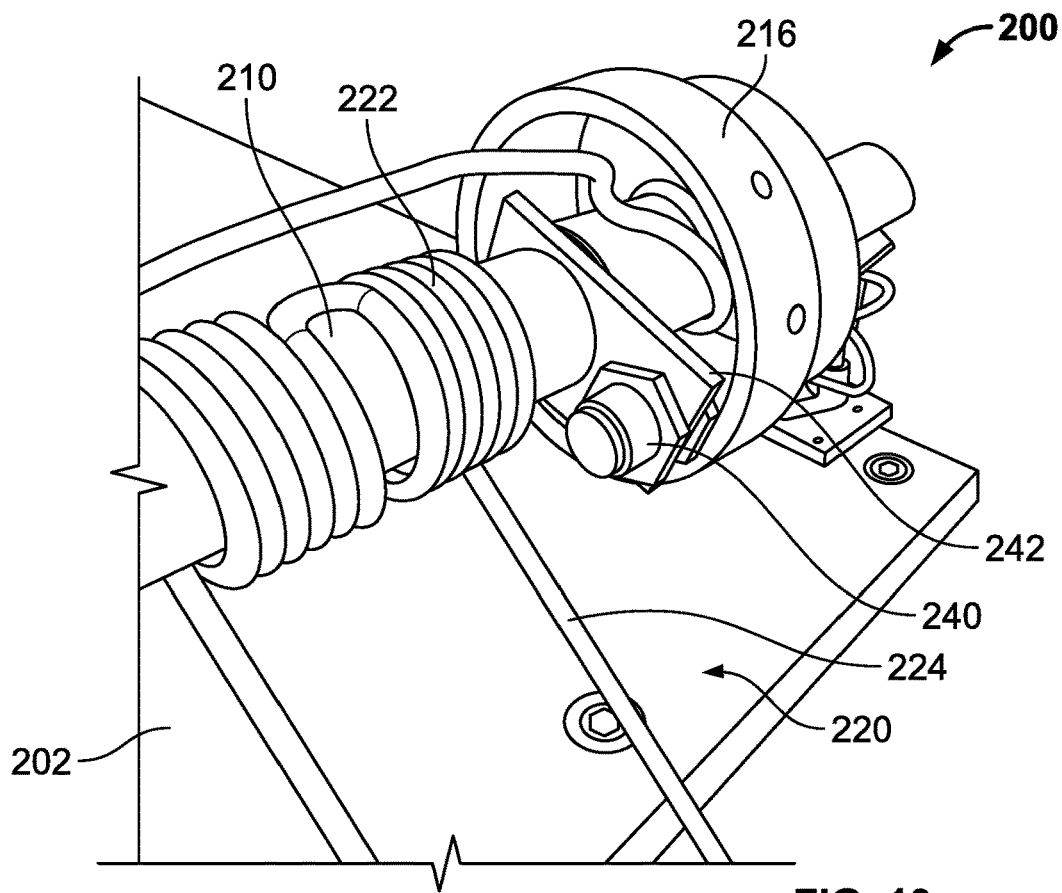
FIG. 10 is a detailed, front perspective view of a feedback assembly of an exemplary harvester of the present disclosure.
Figure 11:
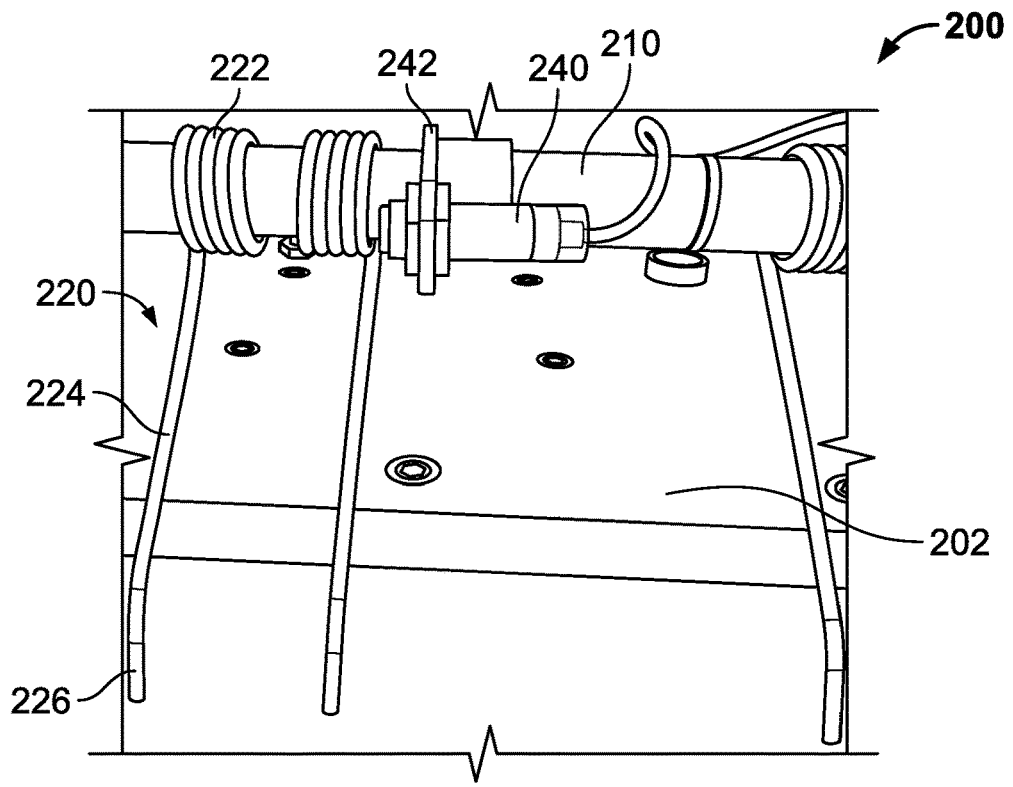
FIG. 11 is a detailed, front view of a feedback assembly of an exemplary harvester of the present disclosure.

FIGS. 10 and 11 show detailed views of the feedback assembly 200. The sensor 240 can be mounted immediately adjacent to one of the tines 220 and can detect rotation of one or more tines 220. For example, the sensor 240 can detect the independent rotation of two or more tines 220. In one embodiment, rather than detecting the magnitude of rotation of the tine 220, the sensor 240 can detect any change in rotational position, and electronically transmits such change in rotational position to the controller 115. Any change in rotational position, such as a change greater than a predetermined value, can correspond with the feedback assembly 200 detecting uneven crop at the location of the rotated tine 220. The sensor 240 can also detect which tine 220 of the feedback assembly 200 rotates, thereby transmitting to the controller 115 the exact position in which uneven crop was detected. In one embodiment, each sensor 240 can be wirelessly coupled to the controller 115. In one embodiment, each sensor 240 can be wired to the controller 115 to allow for communication therebetween. In such embodiment, the wiring for the sensors 240 can extend through the interior of the housing 236. It should be understood that in one embodiment, rotation of each tine 220 is detected by the respective sensor 240 in a contactless manner (e.g., the sensor 240 detects rotation of the tine 220 without contact between the sensor 240 and the tine 220).

Figure 12:
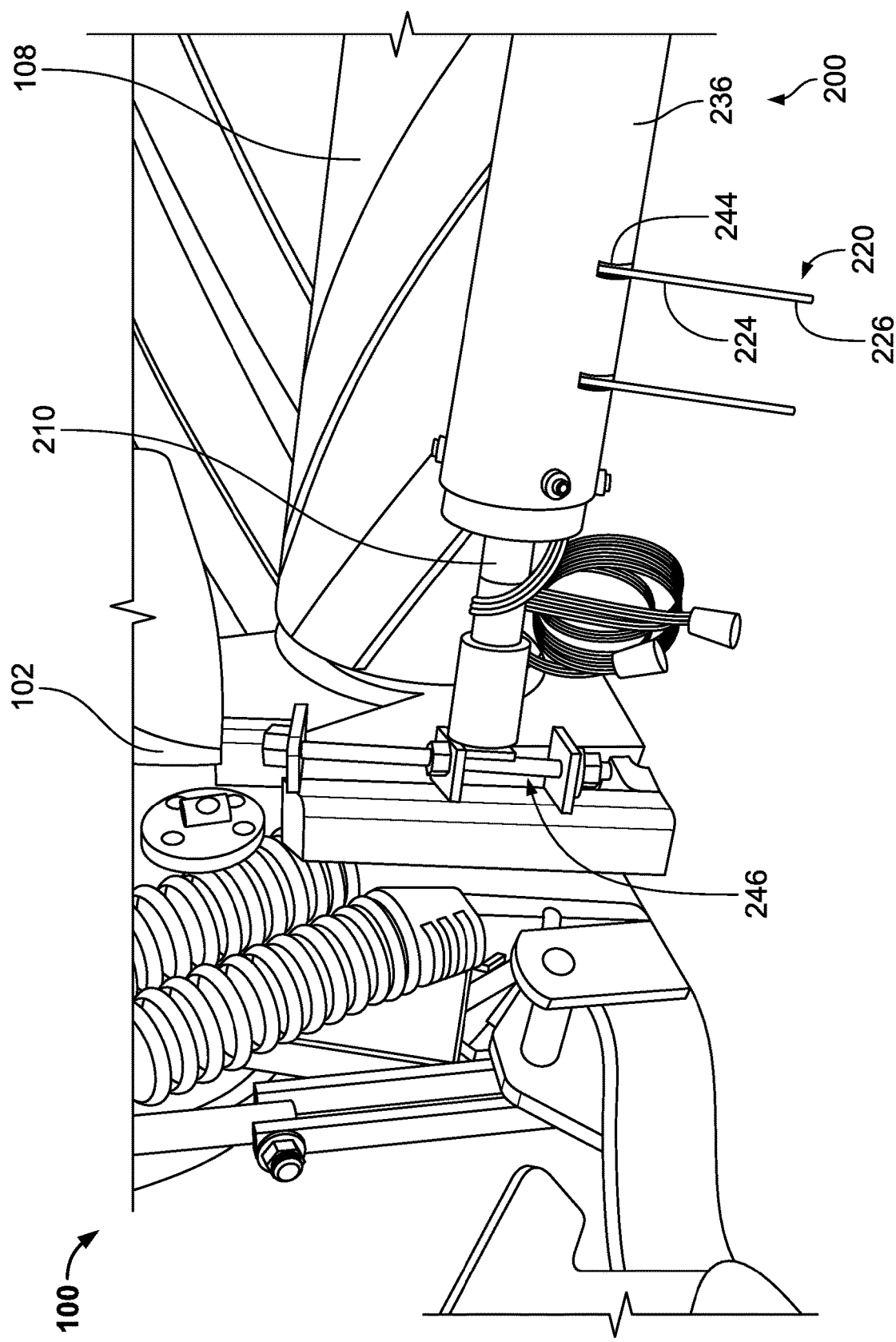
FIG. 12 is a detailed, front view of a feedback assembly of an exemplary harvester of the present disclosure, including a lifting assembly.

FIG. 12 is a detailed view of the harvester 100 including the feedback assembly 200. As noted above, the housing 236 of the feedback assembly 200 comprises slots 244 along which the tines 220 can travel during rotation about the rod 210. The harvester 100 can comprise a lifting assembly 246 that can be regulated from a user interface (e.g., in the cab of the harvester 100). The lifting assembly 246 can control the vertical position of the feedback assembly 200 relative to the ground. Thus, depending on the height of the crop to be tested with the feedback assembly 200, the position of the feedback assembly 200 relative to the ground (and the chassis 102) can be controlled by the operator. In one embodiment, the lifting assembly 246 can comprise a hydraulic actuator that can be automatically adjusted by the operator from the user interface. In one embodiment, the lifting assembly 246 can comprise a mechanical fixation that can be manually adjusted by the operator.

FIGS. 13-17 show diagrammatic front views of the harvester 100 including different configurations of the feedback assembly 200. In FIG. 13, the feedback assembly 200 can comprise a single dedicated sensor 240 for every two substantially linear tines 220. Each sensor 240 is therefore capable of detecting independent rotation of each of the two tines 220. In FIG. 14, the feedback assembly 200 can comprise a single sensor 240 configured to detect independent rotation of each of the tines 220 along a two-piece rod 210. The sensor 240 can be a long range sensor with a signal extending across the tines 220.

In FIG. 15, the feedback assembly 200 can comprise a single sensor 240 configured to detect independent rotation of each of the tines 220 along a one-piece rod 210. For example, the sensor 240 can be in the form of a LIDAR laser outputting a signal across the feedback assembly 200 and/or the tines 220. Passage of the tines 220 out of the signal path or into the signal path indicates rotation of the tine 220. In FIG. 16, the feedback assembly 200 can comprise a single dedicated sensor 240 for each single linear tine 220. The sensor 240 can be a short range sensor configured to detect rotation of only the tine 220 within its range. In FIG. 17, the feedback assembly 200 can comprise a single dedicated sensor 240 configured to detect independent rotation of each of the Y-shaped tines 220. The sensor 240 can be a short range sensor located between the Y-shaped tines 220.

Figure 18:
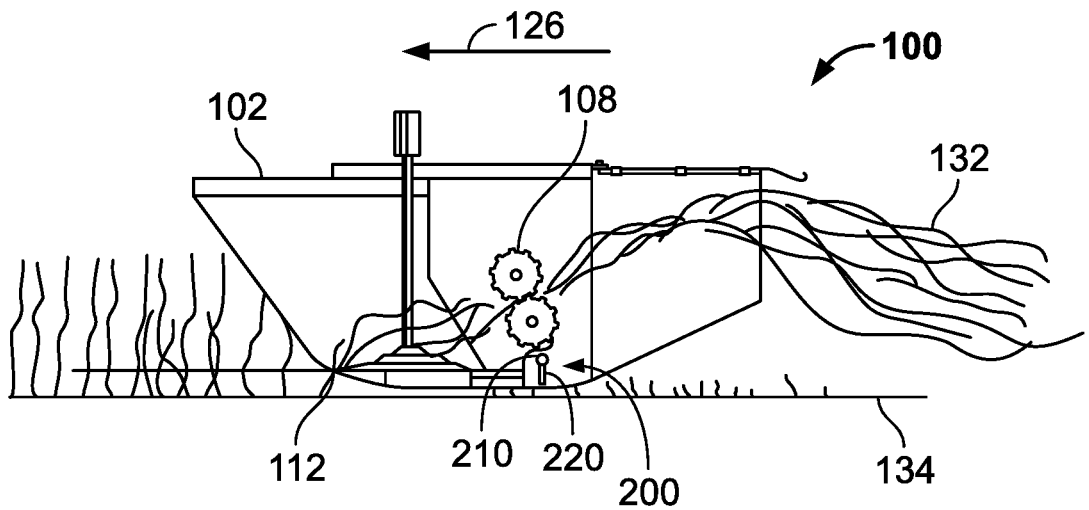
FIG. 18 is a diagrammatic side view of an exemplary harvester including a feedback assembly of the present disclosure, including a header in a non-angled position and short crop.
Figure 19:
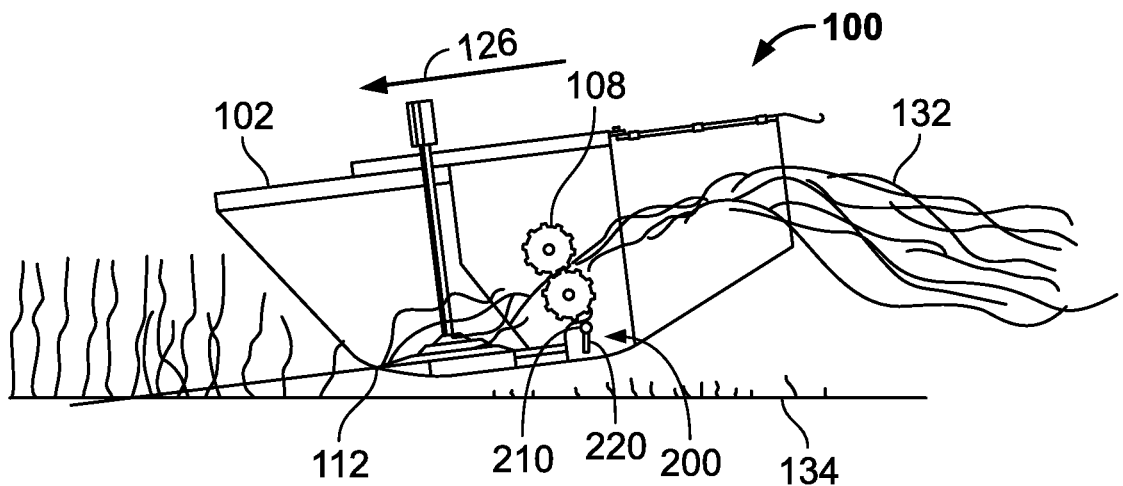
FIG. 19 is a diagrammatic side view of an exemplary harvester including a feedback assembly of the present disclosure, including a header in an angled position and short crop.
Figure 20:
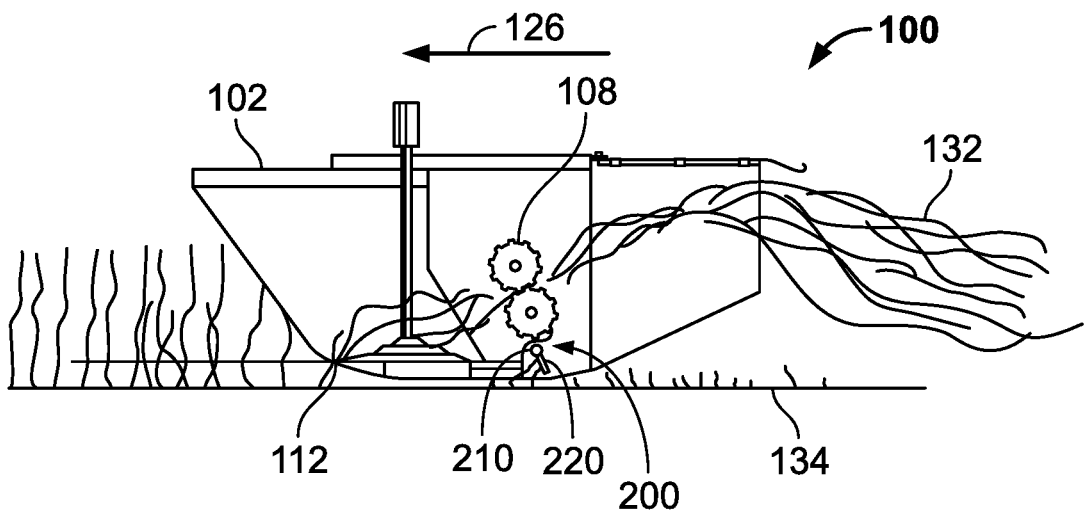
FIG. 20 is a diagrammatic side view of an exemplary harvester including a feedback assembly of the present disclosure, including a header in a non-angled position and long crop.

FIGS. 18-20 show diagrammatic side views of the harvester 100 during different operating configurations. In FIG. 18, the blades 112 of the harvester 100 or header are used to cut crop 132, which passes through the conditioning rolls 108 prior to output at the rear of the harvester 100. When the harvester 100 is in a substantially non-angled position (e.g., substantially parallel to the ground 134 or horizontal), the tines 220 can hand substantially perpendicularly to the ground or horizontal due to the free rotation of the tines 220 about the rod 210. The crop remaining on the ground 134 after cutting is of the desired length. Therefore, the tines 220 are not actuated and remain hanging in the non-actuated position.

In FIG. 19, the harvester 100 is in an angled position (e.g., angled relative to the ground 134 or horizontal). However, due to the free rotation of the tines 220 about the rod 210 and the effect of gravity, the tines 220 continue to hang substantially perpendicularly relative to the ground 134 or horizontal. The desired length of the cut crop is maintained, thereby preventing actuation or rotation of the tines 220.

In FIG. 20, the harvester is in a substantially non-angled position. The crop remaining on the ground 134 after cutting is not of the desired quality, with the remaining crop extending beyond the desired length. The longer crop imparts forces on one or more tines 220 of the feedback assembly 200, resulting in the tines 220 rotation counterclockwise (e.g., in a direction opposite of the direction 126 of travel of the harvester 100). The sensors 240 of the feedback assembly 200 (not shown in FIGS. 18-20) detect rotation of the individual tines 220 (e.g., whether any rotation is detected, the magnitude of the rotation, the location of the rotated tine 220 along the length of the rod 210, combinations thereof, or the like). The detected rotation of the tines 220 is electronically transmitted to the controller 115 which, in turn, adjusts operation of the blades 112 to improve the cutting operation. For example, the controller 115 can adjust operation of the blades 112 corresponding to the lateral position of the rotated tine 220 while maintaining operation of the blades 112 that provided the desired cutting operation. In one embodiment, rotation of the tine 220 can indicate a damages blade 112 in need of replacement. In one embodiment, the controller 115 can adjust, e.g., the ground speed, disc speed, bar angle, or the like, associated with the blades 112.

In some embodiments, the tines 220 can be used to measure crop streaks. For example, if the tines 220 rotate along the rod 210 due to forces imparted on the tines 220 by streaks of uncut crop, rotation of the individual tines 220 can be detected along the length of the rod 210 to determine the position and length of the uncut crop streaks. In some embodiments, the tines 220 can be aligned with the intersection between two or more discs in a disc mower. For example, the tines 220 can be aligned with the intersection of diverging discs where uncut crop may be more present since the blades are moving forward and the crop is merged together at the converging discs. In some embodiments, the tines 220 can be in-line with the diverging discs and in-line with the converging discs, since more crop is funneled between the converging discs and the risk of not cutting a portion of the incoming crop in between the converging discs is generally higher.

Figure 21:
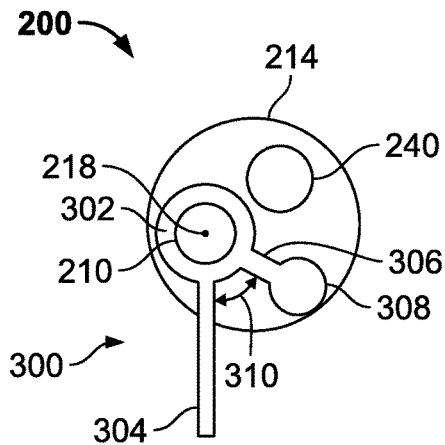
FIG. 21 is a diagrammatic side view of a feedback assembly of an exemplary harvester of the present disclosure.
Figure 22:
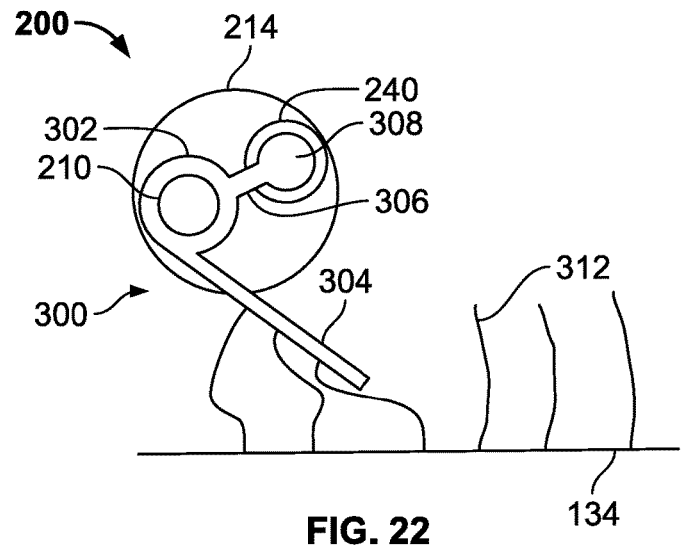
FIG. 22 is a diagrammatic side view of a feedback assembly of an exemplary harvester of the present disclosure.

FIGS. 21-24 show diagrammatic views of different configurations of the feedback assembly 200. In FIG. 21, each tine 300 can comprise a mounting section 302 in the form of a cylindrical tube positioned around the rod 210. Each tine 300 comprises a linear section 304 extending from the mounting section 302. In one embodiment, the linear section 304 can be aligned with the axis 218 of the rod 210. Although shows as only having a linear section 304, in one embodiment, the tine 300 can also comprise an angled section 226. Each tine 300 comprises an offset arm 306 connected to a bolt 308 radially offset by an angle 310 from the linear section 304.

During normal operation, gravity causes the linear section 304 to hang substantially in-line with the axis 218 (e.g., substantially perpendicular to horizontal) (see, e.g., FIG. 21). The feedback assembly 200 comprises one or more sensors 240 radially offset from the linear section 304 in the normal or non-actuated operation mode. Particularly, the sensor 240 can be radially offset by an angle greater than angle 310. The sensor 240 is thereby radially offset from both the linear section 304 and the bolt 308. When streaks of grass or crop 312 are encountered by the tine 300, forces imparted by the crop 312 on the tine 300 rotate the tine 300 about the rod 210. Rotation of the tine 300 automatically radially shifts the linear section 304 and the bolt 308. The sensor 240 detect when the bolt 308 enters the detection zone in front of the sensor 240, indicating that the tine 300 has rotated.

Figure 23:
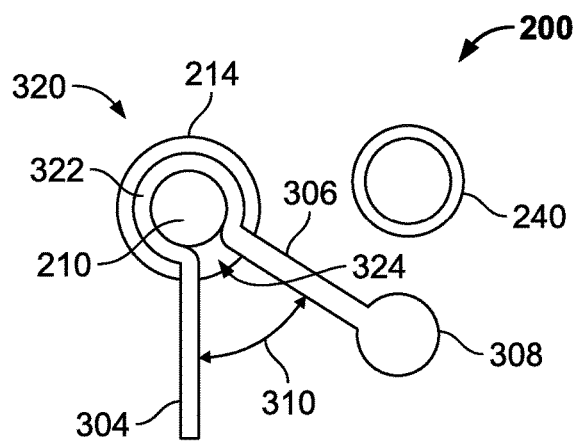
FIG. 23 is a diagrammatic side view of a feedback assembly of an exemplary harvester of the present disclosure.

In FIG. 23, the tine 320 can be substantially similar to the tine 300. However, rather than having a cylindrical mounting section 302, the mounting section 322 of the tine 320 can have an opening or gap 324 between the linear section 304 and the offset arm 306. The gap 324 allows the mounting section 322 to be snapped onto the rod 210 (rather than sliding the rod 210 through the cylindrical mounting section 304, providing a more convenient maintenance or replacement operation of the tines 320.

Figure 24:
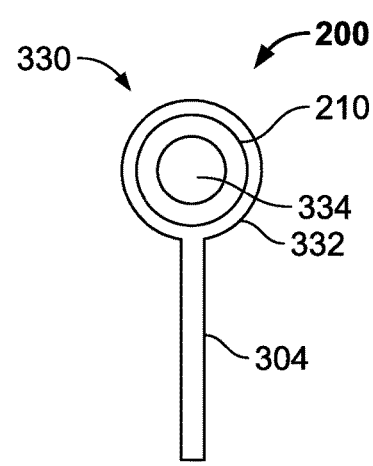
FIG. 24 is a diagrammatic side view of a feedback assembly of an exemplary harvester of the present disclosure.

In FIG. 24, the tine 330 can comprise a mounting section 332 defining a substantially cylindrical tube. The tine 330 also comprises a linear section 304. Rather than including a sensor 240 radially offset from the linear section 304 or a bolt 308, the feedback assembly 200 can comprise a rotary potentiometer 334 (e.g., a sensor) configured to detect the radial position or change of the tine 330. In some embodiments, multiple rotary potentiometers 334 can be used (e.g., each dedicated to a single tine 330) to determine which tine 330 has rotated when grass streaks are detected. In some embodiments, a rotary damper can be incorporated into the tine 330 to ensure smooth operation and rotation of the tine 330.

Figure 25:
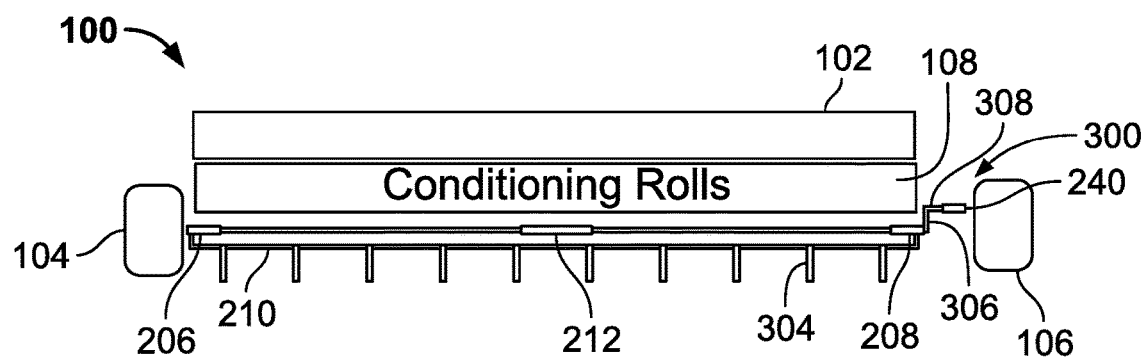
FIG. 25 is a diagrammatic front view of a feedback assembly of an exemplary harvester of the present disclosure.
Figure 26:
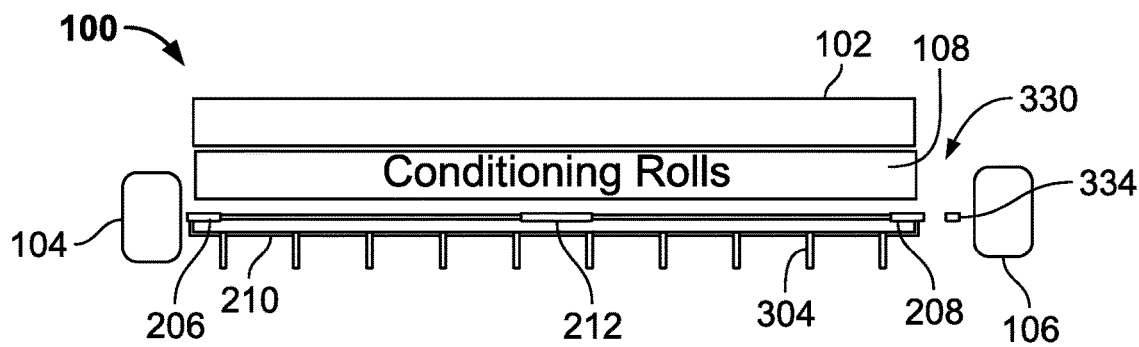
FIG. 26 is a diagrammatic front view of a feedback assembly of an exemplary harvester of the present disclosure.
Figure 27:
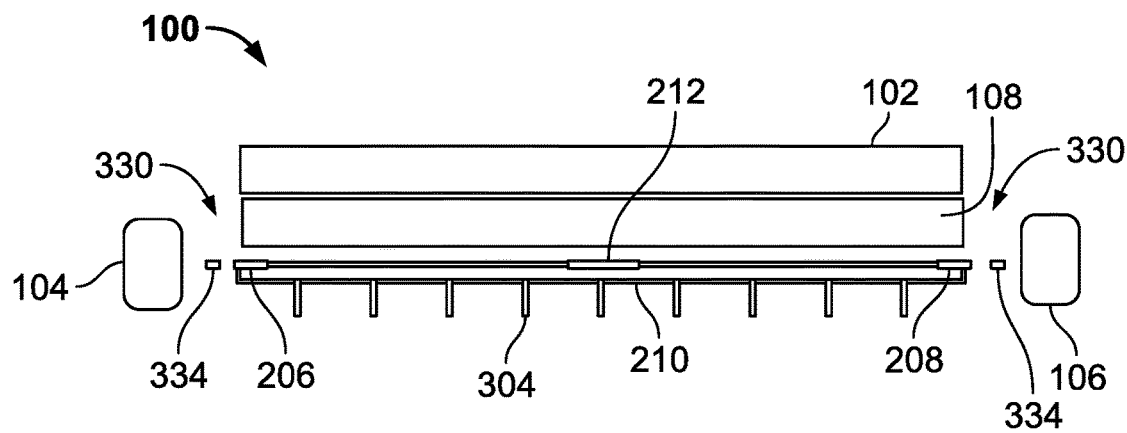
FIG. 27 is a diagrammatic front view of a feedback assembly of an exemplary harvester of the present disclosure.

FIGS. 25-27 show diagrammatic front views of the harvester 100 with different configurations of the tines 300, 330. In FIG. 25, the harvester 100 comprises the tine 300. In FIG. 26, the harvester 100 comprises the tines 330 with a single rotary potentiometer 334 for detecting individual rotation of the linear section 304. In FIG. 27, two or more rotary potentiometers 334 can be used to detect rotation of only a fraction (e.g., half) of the linear sections 304.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A mower, comprising:
   a chassis;
   a cutterbar connected to the chassis;
   a feedback assembly connected to the chassis rearward of the cutterbar, the feedback assembly comprising:
   at least one rod coupled to the chassis; and
   at least one tine rotatably coupled to the at least one rod, the at least one tine defining an elongated body comprising a linear section extending from the at least one rod;
   at least one sensor coupled to at least one of the chassis or the-at least one rod, the at least one sensor configured for detecting the quality of operation of the at least one blade assembly by detecting at least one of a rotational position or magnitude of rotation of the at least one tine relative to the at least one rod.

2. The mower of claim 1, wherein the at least one rod is fixedly coupled to the chassis.

3. The mower of claim 1, wherein the at least one tine is configured to hang substantially perpendicularly relative to a direction of travel of the chassis when in a non-actuated position.

4. The mower of claim 1, wherein the at least one tine is independently rotatable relative to the at least one rod.

5. The mower of claim 1, wherein the at least one tine is configured to rotate away from a direction of travel of the chassis when in an actuated position.

6. The mower of claim 1, wherein the tine includes an angled section that extends from the linear section in a direction away from a direction of travel of the chassis.

7. The mower of claim 1, wherein the elongated body of the at least one tine comprises an elongated rod defining a uniform diameter.

8. The mower of claim 1, wherein the linear section defines about 75% of an overall length of each tine, and the angled section defines about 25% of the overall length of each tine.

9. The mower of claim 1, wherein the angle between the angled section and the linear section is from about 15 degrees to about 45 degrees.

10. The mower of claim 1, wherein the at least one tine is aligned rearward of the intersection of at least one of diverging discs or converging discs of the cutterbar.

11. The mower of claim 1, wherein the at least one sensor comprises at least one or a combination chosen from: an optical sensor, a photoelectric sensor, or a rotary potentiometer.

12. The mower of claim 1, further comprising a seal disposed over the at least one sensor.

13. The mower of claim 1, further comprising a housing disposed over the at least one rod, the at least one tine rotatably disposed relative to the housing.

14. The mower of claim 1, wherein the at least one rod comprises a left-hand rod and a right-hand rod connected at a central support, the at least one tine comprises a left hand tine and a right tine and the at least one sensor comprises a left hand sensor and aright hand sensor, wherein the left hand tine is coupled to the left hand rod, the right hand tine is coupled to the right hand rod and the left hand sensor positioned to determine the position of the left hand time and the right hand sensor positioned to determine the position of the right hand tine.

15. A harvester, comprising:
a frame;
first and second wheels rotatably coupled to the frame;
a cutterbar connected to the frame and defining a cutting width; and
a feedback assembly positioned rearward of the cutterbar, the feedback assembly comprising:
a chassis;
at least one rod coupled to the chassis and extending across the majority of the cutting width; and
at least one tine rotatably coupled to the at least one rod, the at least one tine defining an elongated body comprising a linear section extending from the at least one rod, and an angled section extending at an angle from the linear section;
at least one sensor configured to detect at least one of a rotational position or magnitude of rotation of the at least one tine relative to the at least one rod.

16. The harvester of claim 15, comprising at least one conditioner rotatably coupled to the frame.

17. The harvester of claim 15, comprising a lifting assembly operably coupling the feedback assembly to the frame, wherein the lifting assembly comprises an actuator configured to control the vertical position of the feedback assembly relative to a ground surface.

18. The harvester of claim 15, wherein the at least one cutterbar assembly comprises at least one blade assembly rotatably coupled to the frame.

19. A harvester, comprising:
a frame;
a plurality of cutting assemblies connected to the frame and defining a cutting width;
a feedback assembly for detecting the quality of operation of at least one of the plurality of cutting assemblies, the feedback assembly comprising:
a chassis connectable to the frame;
at least one rod coupled to the chassis rearward of the plurality of cutting assemblies and extending across a majority of the cutting width; and
at least one tine rotatably coupled to the at least one rods;
wherein the at least one tine is configured to hang substantially perpendicularly relative to a direction of travel of the frame when in a non-actuated position; and
wherein the at least one tine is configured to rotate away from the direction of travel of the chassis when in an actuated position;
at least one sensor configured to detect at least one of a rotational position or magnitude of rotation of the at least one tine relative to the at least one rod.

* * * * *